US011328190B2

(12) United States Patent
Hoshikawa et al.

(10) Patent No.: US 11,328,190 B2
(45) Date of Patent: May 10, 2022

(54) EDITING DEVICE, PRINTING SYSTEM AND EDITING METHOD

(71) Applicant: BROTHER KOGYO KABUSHIKI KAISHA, Nagoya (JP)

(72) Inventors: Hideyuki Hoshikawa, Nagoya (JP); Hideaki Ueda, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/206,708

(22) Filed: Mar. 19, 2021

(65) Prior Publication Data
US 2021/0303948 A1 Sep. 30, 2021

(30) Foreign Application Priority Data

Mar. 31, 2020 (JP) .............................. JP2020-062819

(51) Int. Cl.
*G06K 15/02* (2006.01)
*G06K 15/00* (2006.01)

(52) U.S. Cl.
CPC ....... *G06K 15/1868* (2013.01); *G06K 15/002* (2013.01); *G06K 15/024* (2013.01)

(58) Field of Classification Search
None
See application file for complete search history.

(56) References Cited

U.S. PATENT DOCUMENTS

| 2015/0123993 | A1* | 5/2015 | Ohba | ................. G09G 5/14 345/629 |
| 2018/0176397 | A1* | 6/2018 | Nishiura | .......... H04N 5/232935 |
| 2018/0281471 | A1 | 10/2018 | Ito et al. | |

FOREIGN PATENT DOCUMENTS

| JP | 2016-7776 A | 1/2016 |
| JP | 2016-71238 A | 5/2016 |
| JP | 2018-171870 A | 11/2018 |
| JP | 2019-53586 A | 4/2019 |

* cited by examiner

*Primary Examiner* — Lennin R Rodriguezgonzalez
(74) *Attorney, Agent, or Firm* — Kenealy Vaidya LLP (57) ABSTRACT

A controller of an editing device executes displaying, on a display unit, an input area image corresponding to an input area in which the characters are arranged by overlapping the input area image on a medium image showing the printing medium, changing a size of the input area image displayed in the displaying, using first method or second method, according to a first instruction for changing the size of the input area, the first method being changing the size of the input area by setting a portion of the medium image corresponding to the non-light-transmitting area as a maximum range, the second method being changing the size of the input area by setting the entire medium image as a maximum range, and switching between the first method and the second method as a first switching.

10 Claims, 8 Drawing Sheets

EDITING DEVICE, PRINTING SYSTEM AND EDITING METHOD

CROSS REFERENCE TO RELATED APPLICATIONS

This application is based on Japanese Patent Applications No. 2020-062819 filed on Mar. 31, 2020, the entire contents of which are incorporated herein by reference.

TECHNICAL FIELD

The present invention relates to an editing device, a printing system and an editing method for editing characters to be printed on a printing medium.

BACKGROUND ART

JP-A-2019-53586 discloses a printing system including a label printer and an operation terminal. The label printer and the operation terminal are connected so as to be able to communicate with each other. In the printing system, an operator can edit content of a text to be printed on a print label in the label printer by using an editing application executed on the operation terminal. In the editing application, a text editing area frame is overlapped on an image showing the print label. The operator inputs characters into the text editing area frame by operating the operation terminal. Accordingly, the characters are arranged in a superimposed manner at a specific position of the image showing the print label. The label printer performs printing based on print information or the like generated by the operation terminal by executing the editing application, and prints the characters at the specific position on the print label.

As in Japanese Patent No. 6379724, a printing medium including an area having translucency (hereinafter referred to as a "light-transmitting area") and an area having no translucency (hereinafter referred to as a "non-light-transmitting area") may be used.

When printing is performed in the light-transmitting area, a color of an adherend can be seen through while ink is attached to the adherend. Therefore, when a color of characters to be printed is similar to the color of the adherend, visibility of the characters may be lowered. Therefore, when a layout of the characters on the printing medium is edited in an editing device, the characters are preferably not to be arranged in the light-transmitting area as much as possible. On the other hand, for example, when the printing medium is attached to a cable or the like by being wound therearound, printing a mark for alignment in the light-transmitting area is also required. For this reason, preferably, the editing device can arrange the characters in the light-transmitting area as desired by the operator.

An object of the present invention is to provide an editing device, a printing system and an editing method capable of laying out characters or the like such that printing in the light-transmitting area of a printing medium is suppressed and the printing in the light-transmitting area is performed as required.

SUMMARY (1) According to an aspect of the invention, an editing device includes a controller configured to edit a layout of characters to be printed on a printing medium including a light-transmitting area having translucency and a non-light-transmitting area having no translucency. In the editing device, the controller executes displaying, on a display unit, an input area image corresponding to an input area in which the characters are arranged by overlapping the input area image on a medium image showing the printing medium, changing a size of the input area image displayed in the displaying, using first method or second method, according to a first instruction for changing the size of the input area, the first method being changing the size of the input area by setting a portion of the medium image corresponding to the non-light-transmitting area as a maximum range, the second method being changing the size of the input area by setting the entire medium image as a maximum range, and switching between the first method and the second method as a first switching.

(2) According to another aspect of the invention, an editing device includes a controller configured to edit a layout of characters to be printed on a printing medium including a light-transmitting area having translucency and a non-light-transmitting area having no translucency. In the editing device, the controller executes displaying, on a display, an input area image corresponding to an input area in which the characters are arranged by overlapping the input area image on a medium image showing the printing medium, changing a size of the input area image displayed in the displaying, using first method or second method, according to a second instruction for arranging the characters in the input area, the first method being changing the size of the input area by setting a portion of the medium image corresponding to the non-light-transmitting area as a maximum range, the second method being changing the size of the input area by setting the entire medium image as a maximum range, and switching between the first method and the second method as a second switching.

(3) According to another aspect of the invention, a printing system includes the editing device according to the aspect (1), and a printing device configured to print the characters on the printing medium based on the layout edited by the editing device.

(4) According to another aspect of the invention, a printing system includes the editing device according to the aspect (2), and a printing device configured to print the characters on the printing medium based on the layout edited by the editing device.

(5) According to another aspect of the invention, an editing method for editing a layout of characters to be printed on a printing medium including a light-transmitting area having translucency and a non-light-transmitting area having no translucency includes displaying, on a display unit, an input area image corresponding to an input area in which the characters are arranged by overlapping the input area image on a medium image showing the printing medium, changing a size of the input area image displayed in the displaying, using first method or second method, according to a first instruction for changing the size of the input area, the first method being changing the size of the input area by setting a portion of the medium image corresponding to the non-light-transmitting area as a maximum range, the second method being changing the size of the input area by setting the entire medium image as a maximum range, and switching between the first method and the second method as a first switching.

(6) According to another aspect of the invention, an editing method for editing a layout of characters to be printed on a printing medium including a light-transmitting area having translucency and a non-light-transmitting area having no translucency includes displaying, on a display unit, an input area image corresponding to an input area in which the characters are arranged by overlapping the input area image on a medium image showing the printing medium, changing a size of the input area image displayed by the displaying, using first method or second method, according to a second instruction for arranging the characters in the input area, the first method being changing the size of the input area by setting a portion of the medium image corresponding to the non-light-transmitting area as a maximum range, the second method being changing the size of the input area by setting the entire medium image as a maximum range, and switching between the first method and the second method as a second switching.

DESCRIPTION OF EMBODIMENTS

A printing system 100 according to an embodiment of the present invention will be described with reference to drawings. The drawings are used to illustrate technical features that can be adopted by the present invention. That is, a configuration and control of a device described in the drawings are not intended to be limited thereto, and are merely explanatory examples.

Overview of Printing System 100

Figure 1:
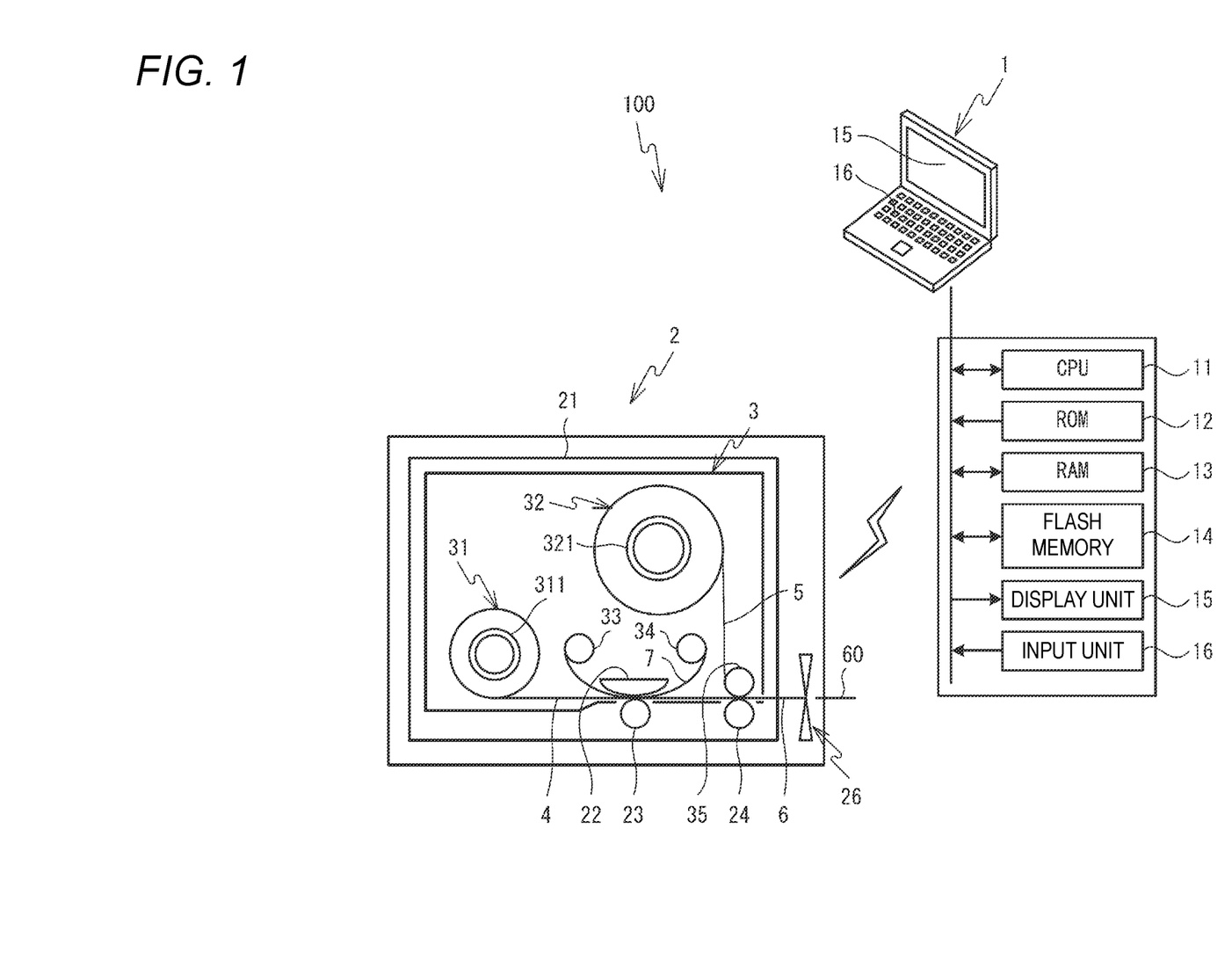
FIG. 1 is an explanatory view showing a schematic configuration of a printing system 100.

An overview of the printing system 100 will be described with reference to FIG. 1. The printing system 100 includes an editing device 1 and a printing device 2. The editing device 1 is, for example, a personal computer, and may communicate with the printing device 2 wirelessly or by wire. The editing device 1 edits the position and size of one or two or more characters, numerals, codes, symbols, graphics and the like to be printed on a tape 6 (hereinafter referred to as "characters") to generate print data, and transmits the generated print data to the printing device 2. The printing device 2 prints the characters on a film 4 constituting the tape 6 based on the print data transmitted from the editing device 1. The printing device 2 produces a printing tape 60 by cutting the tape 6 subjected to printing on the film 4. The produced printing tape 60 is attached to a cable 10 or the like (see FIG. 3).

An electrical configuration of the editing device 1 will be described with reference to FIG. 1. The editing device 1 includes a CPU 11, a ROM 12, a RAM 13, a flash memory 14, a display unit 15 and an input unit 16 that are connected to each other. The CPU 11 functions as a processor and controls the editing device 1. The ROM 12 stores a program for the CPU 11 to execute main processing (see FIGS. 12 and 13) described later, information required by the CPU 11 when the program is executed, and the like. The RAM 13 temporarily stores various data and the like to be referred to by the CPU 11. The flash memory 14 stores print data and the like required for printing. The display unit 15 is an LCD. The input unit 16 is a keyboard, a mouse or the like, and outputs a signal corresponding to an operation to the CPU 11.

A mechanical configuration of the printing device 2 will be described with reference to FIG. 1. The printing device 2 includes a mounting portion 21. A tape cassette 3 is detachably attached to the mounting portion 21. A first tape roll 31, a second tape roll 32, a ribbon roll 33, a ribbon roll-up spool 34 and a pressing roller 35 are provided in the tape cassette 3.

The first tape roll 31 is formed by winding the film 4 around a first spool 311. The second tape roll 32 is formed by winding a double-sided adhesive tape 5 around a second spool 321. The ribbon roll 33 is formed by winding an ink ribbon 7 around a ribbon spool (not shown). The ink ribbon 7 bridges between the ribbon roll 33 and the ribbon roll-up spool 34. The ribbon roll-up spool 34 rolls up the ink ribbon 7 used for printing. The pressing roller 35 is exposed to outside from the tape cassette 3.

The mounting portion 21 is provided with a thermal head 22, a platen roller 23 and a pressing roller 24. The thermal head 22 performs printing by transferring ink 71 (see FIG. 2) from the ink ribbon 7 to the film 4. In the present embodiment, a color of the ink 71 is black. The platen roller 23 sandwiches the film 4 with the thermal head 22 and conveys while pulling out the film 4 from the first tape roll 31 by rotating.

The pressing roller 24 sandwiches the film 4 and the double-sided adhesive tape 5 with the pressing roller 35. The double-sided adhesive tape 5 is pressure-bonded to a printing surface 41 (see FIG. 2) of the film 4 to form the tape 6. The pressing rollers 24, 35 convey the tape 6 while pulling out the double-sided adhesive tape 5 from the second tape roll 32 by rotating. A cutter 26 is provided downstream of the pressing roller 24 in a conveyance direction of the tape 6. The cutter 26 cuts the tape 6.

A controller (not shown) of the printing device 2 performs a printing operation as follows. As the platen roller 23 rotates, the film 4 is pulled out from the first tape roll 31. The ink 71 is transferred from the ink ribbon 7 to the pulled out film 4 by the thermal head 22, and the characters are printed.

The double-sided adhesive tape 5 is pulled out from the second tape roll 32. The printed film 4 is pressure-bonded to the pulled out double-sided adhesive tape 5 by the pressing rollers 24, 35 to form the tape 6. The tape 6 is cut by the cutter 26 to produce the printing tape 60.

Details of Tape 6

Figure 2:
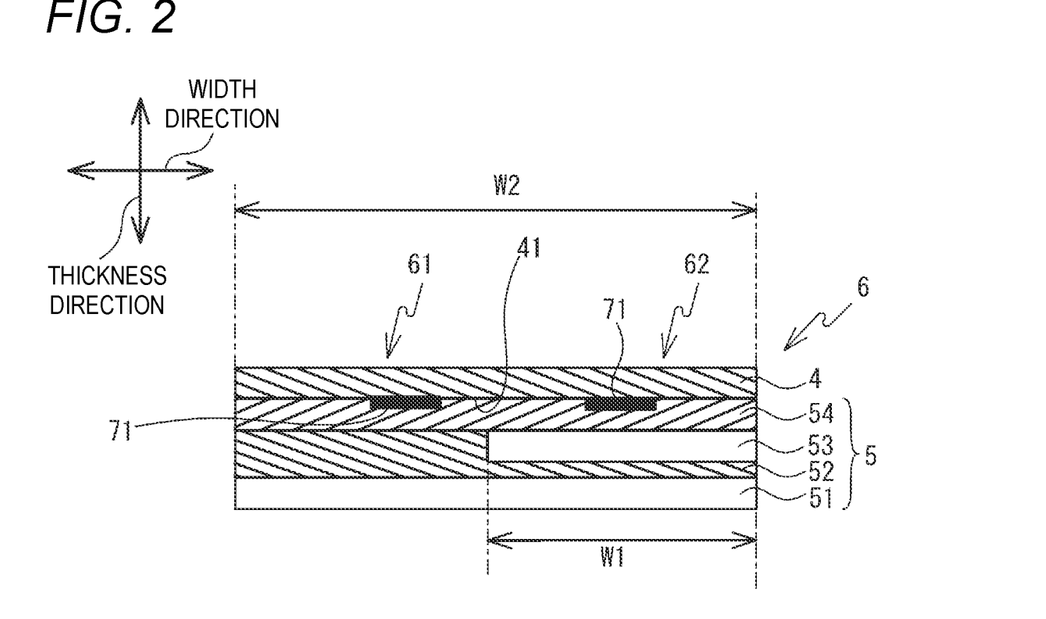
FIG. 2 is a schematic view of a tape 6 viewed from an elongated direction.

A detailed structure of the tape 6 will be described with reference to FIG. 2. Hereinafter, an elongated direction of the tape 6 is simply referred to as the "elongated direction", a width direction of the tape 6 is simply referred to as the "width direction", and a thickness direction of the tape 6 is simply referred to as the "thickness direction". In FIG. 2, a left-right direction, an upper-lower direction and a direction orthogonal to a paper surface are respectively the width direction, the thickness direction and the elongated direction.

The tape 6 has the structure in which the film 4 and the double-sided adhesive tape 5 are laminated on each other. The film 4 is a transparent film having an elongated shape. In the present embodiment, "transparent" is a property of a medium in which an object or printed content on a back side of the medium is visible from a front side of the medium, and includes colorless transparent, colored transparent, colorless translucent and colored translucent. That is, "transparent" refers to a property of a medium having translucency. Hereinafter, a property of a medium having no translucency is referred to as "opaque". In FIG. 2, a transparent medium is shaded and an opaque medium is plain.

The double-sided adhesive tape 5 has an elongated shape. The double-sided adhesive tape 5 is formed by laminating a release paper 51, an adhesive layer 52, a mount 53 and an adhesive layer 54 in this order in the thickness direction. The release paper 51 has an elongated shape and has a shape substantially the same as the film 4. The adhesive layer 52 is transparent and is provided on an entire surface of one surface of the release paper 51. The mount 53 is opaque and is provided on a part of a surface of the adhesive layer 52 opposite to the release paper 51. In the present embodiment, a color of the mount 53 is white. A width W1 of the mount 53 is shorter than a width W2 of the film 4. The adhesive layer 54 is transparent and is provided on a portion of the adhesive layer 52 opposite to the release paper 51 excluding the mount 53 and on a surface of the mount 53 opposite to the release paper 51. The printing surface 41 of the film 4 is bonded to a surface of the adhesive layer 54 opposite to the adhesive layer 52 or the mount 53.

Since the mount 53 is opaque, an area of the mount 53 of the tape 6 (hereinafter referred to as an "opaque area 62") is opaque even when the release paper 51 is peeled off from the double-sided adhesive tape 5. Since the adhesive layers 52, 54 and the film 4 are transparent in a portion of the tape 6 where the mount 53 does not exist (hereinafter referred to as a "transparent area 61"), the portion is transparent when the release paper 51 is peeled off from the double-sided adhesive tape 5. The transparent area 61 and the opaque area 62 are arranged in the width direction and extend in the elongated direction.

Method of Using Printing Tape 60

Figure 3:
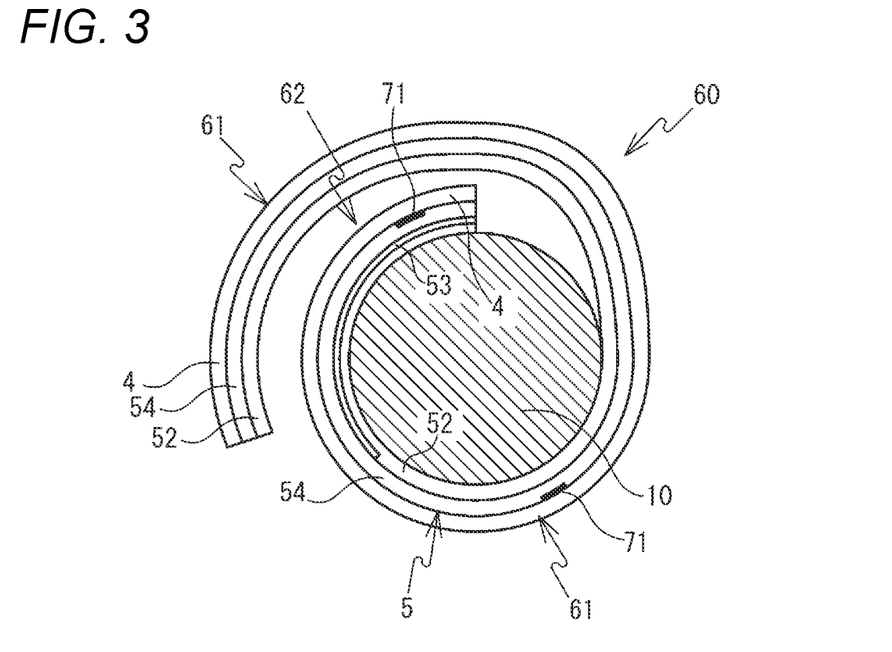
FIG. 3 is a view showing a printing tape 60 in a process of being wound around a cable 10.

An example of a method of using the printing tape 60 in which the tape 6 is cut will be described with reference to FIGS. 3 to 5. FIG. 3 is a view of the printing tape 60 being attached to the cable 10 as viewed from an axial direction of the cable 10. First, a user peels off the release paper 51 (see FIG. 2) from the printing tape 60. The user attaches the printing tape 60 around the cable 10 with the exposed adhesive layer 52 inside. The elongated direction of the printing tape 60 coincides with the axial direction of the cable 10. In this case, if a length of the printing tape 60 in the width direction is larger than a length of an outer circumference of the cable 10, the printing tape 60 is wound such that the transparent area 61 covers the opaque area 62 from the outside.

Figure 4:
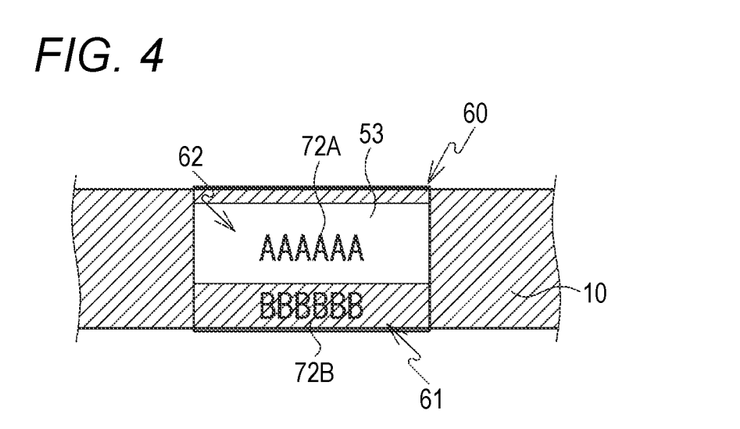
FIG. 4 is a view showing the printing tape 60 wound around the cable 10.
Figure 5:
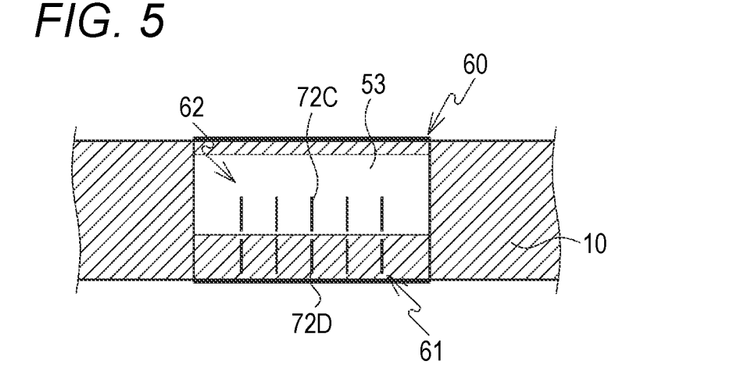
FIG. 5 is a view showing the printing tape 60 wound around the cable 10.

FIG. 4 is a view of the printing tape 60 attached to the cable 10 as viewed from a direction orthogonal to the axial direction of the cable 10, When the user views the printing tape 60 attached to the cable 10, the user visually recognizes characters 72A "AAAAAA" printed on the printing tape 60 against a background of the mount 53 for the opaque area 62. On the other hand, for the transparent area 61, characters 72B "BBBBBB" printed on the printing tape 60 are visible against a background of the cable 10. This is because the transparent area 61 is transparent and the cable 10 may be seen through.

In the above, since the background of the characters 72A is the mount 53, the characters 72A and the background are clearly distinguished, and visibility of the characters 72A is maintained. On the other hand, since the background of the characters 72B is the cable 10, it may be difficult to distinguish the characters 72B from the background due to a relationship between the color of the ink 71 for printing the characters 72B and a color of the cable 10. Therefore, when a position of the characters to be printed on the tape 6 is edited using the editing device 1, it is preferable that the characters are not arranged in the transparent area 61 as much as possible. On the other hand, for example, as shown in FIG. 5, there is also a request to print a symbol 72D for aligning a position with a symbol 72C printed in the opaque area 62 in the transparent area 61 such that alignment can be performed when the printing tape 60 is wound around the cable 10. Therefore, preferably, the editing device 1 arranges the characters in the transparent area 61 as desired by the user.

Overview of Editing Processing by Editing Device 1

Figure 6:
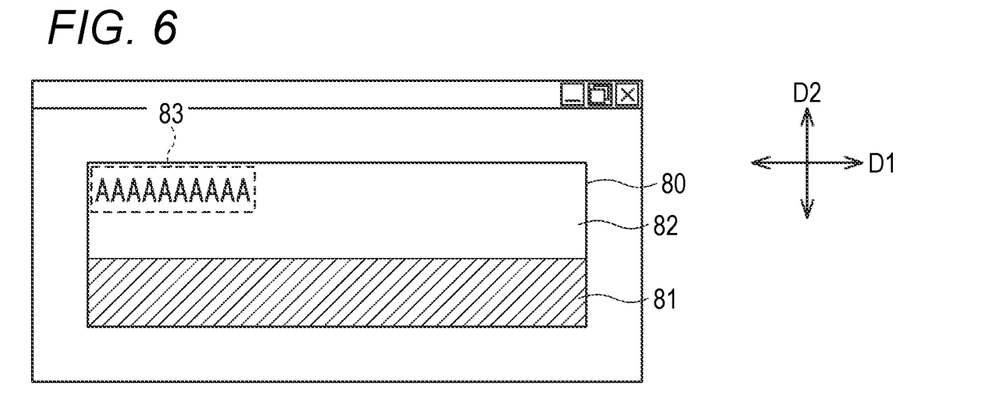
FIG. 6 is a view showing a screen displayed on a display unit 15 when editing processing is executed.

FIG. 6 shows an example of a screen displayed on the display unit 15 (see FIG. 1) when processing of editing the position and size of the characters to be printed on the tape 6 (hereinafter referred to as "editing processing") is executed in the editing device 1. A medium image 80 and an input area image 83 indicating an input area are displayed on the display unit 15.

The medium image 80 is an image showing the tape 6 which is a printing medium during printing by the printing device 2. The medium image 80 is a rectangle that is long in the left-right direction. The left-right direction of the medium image 80 coincides with the elongated direction of the tape 6. The upper-lower direction of the medium image 80 coincides with the width direction of the tape 6. A left end of the medium image 80 corresponds to a leading end of the tape 6. The medium image 80 has a transparent portion 81 and an opaque portion 82. The transparent portion 81 corresponds to the transparent area 61 of the tape 6 in the medium image 80. The opaque portion 82 corresponds to the opaque area 62 of the tape 6 in the medium image 80. The input area image 83 is arranged so as to be overlapped on the left end of the medium image 80, The characters to be printed by the printing device 2 are arranged in the input area indicated by the input area image 83. The characters are arranged in the left-right direction. Hereinafter a direction in which the characters are arranged is referred to as an "arrangement direction D1".

The editing device 1 generates the print data for printing the characters after the input area image 83 is arranged in the medium image 80 and the characters are arranged in the input area indicated by the input area image 83. Hereinafter, arrangement of the input area image 83 and arrangement of the characters in the input area are referred to as "a layout of the characters is edited". The printing device 2 performs printing on the tape 6 based on the print data generated by the editing device 1. The printing device 2 cuts the printed tape 6 in the width direction to produce the printing tape 60.

Figure 7:
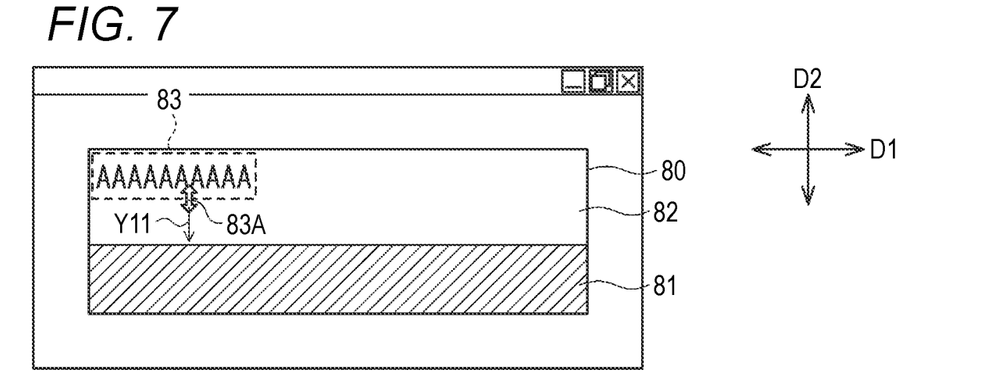
FIG. 7 is a view showing a state in which size of an input area image 83 indicating an input area is enlarged by a cursor 83A.

The editing device 1 may change a size of the input area image 83 according to an operation input via the input unit 16. For example, as shown in FIG. 7, when an operation (an arrow Y11) of moving a cursor 83A arranged to be overlapped on a boundary of a lower end of the input area image 83 is input, the editing device 1 enlarges the size of the input area image 83 downward. For example, when an operation of maximizing the input area image 83 (for example, selecting a menu button for maximizing or pressing a shortcut key) is input, the editing device 1 enlarges the size of the input area image 83 to the maximum. Hereinafter, an instruction to be input to the input unit 16 for changing the size of the input area image 83 is referred to as a "size change instruction".

Figure 8:
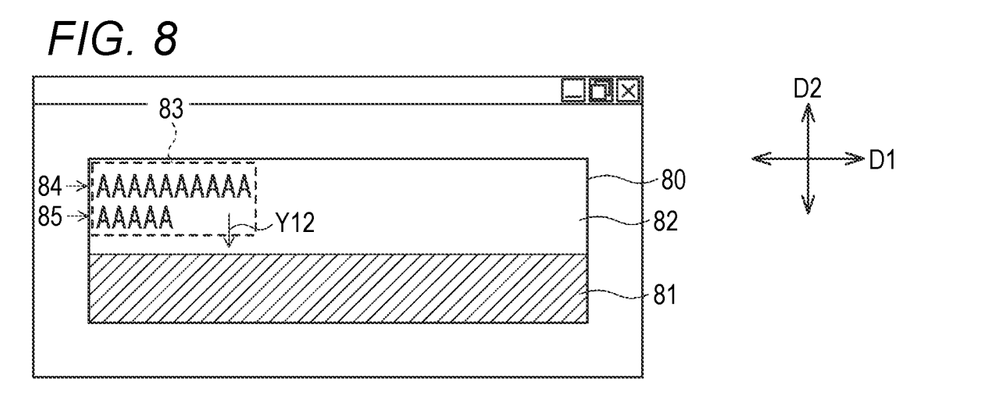
FIG. 8 is a view showing a state in which the size of the input area image 83 is enlarged by maximization.

As shown in FIG. 8, when the characters do not fit in the input area image 83 while being arranged in the arrangement direction D1 due to an increase in the number of characters input via the input unit 16, the editing device 1 inserts a line feed between the characters such that the characters fit in the input area image 83 in the arrangement direction D1. Accordingly, rows 84, 85 in which the characters are arranged in the arrangement direction D1 are formed. The rows 84, 85 are arranged in an orthogonal direction D2 orthogonal to the arrangement direction D1. At this time, the editing device 1 enlarges the size of the input area image 83 downward such that the rows 84, 85 fall fit in the input area image 83 in the orthogonal direction D2 (an arrow Y12). Hereinafter, an instruction to be input to the input unit 16 for arranging the characters in the input area image 83 is referred to as a "character arrangement instruction".

Figure 9:
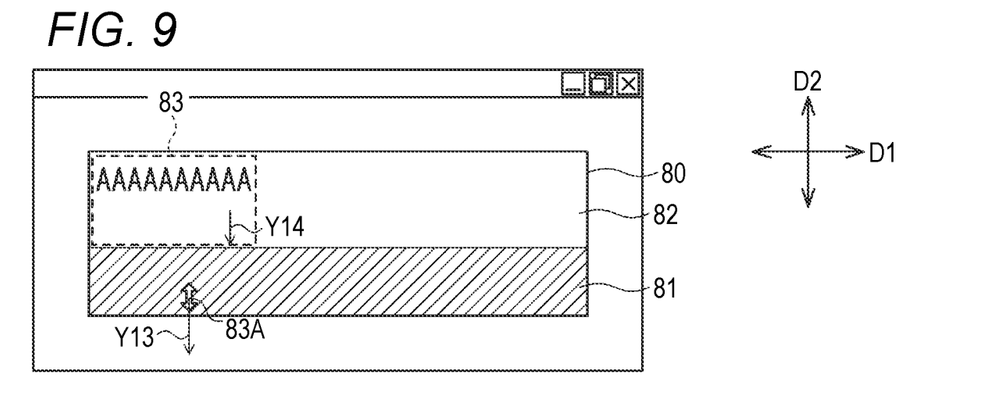
FIG. 9 is a view showing a state in which the size of the input area image 83 is enlarged by a first method according to a first instruction.
Figure 10:
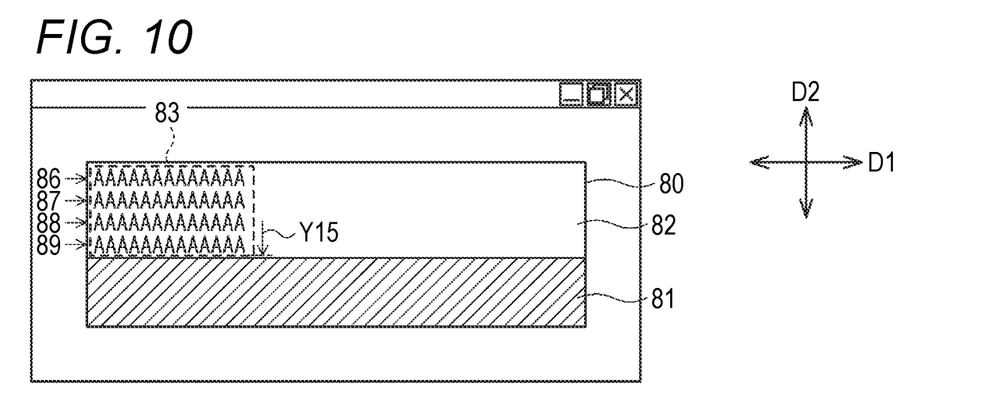
FIG. 10 is a view showing a state in which the size of the input area image 83 is enlarged by the first method according to a second instruction.

When the size of the input area image 83 is changed as described above, the editing device 1 limits a maximum range in which the input area image 83 changed in size may be arranged to any of the following two. The first is that the maximum range in which the input area image 83 changed in size may be arranged is the opaque portion 82 of the medium image 80. Hereinafter, a change method of changing the size of the input area image 83 such that the opaque portion 82 is the maximum range is referred to as an opaque change method. In this case, for example, as shown in FIG. 9, even when an operation of moving the cursor 83A to the transparent portion 81 (an arrow Y13) is input via the input unit 16, the size of the input area image 83 is enlarged only in a range of the opaque portion 82 (an arrow Y14). For example, as shown in FIG. 10, a plurality of line feeds are inserted between the characters as the number of characters increases, and rows 86, 87, 88, 89 are formed. In this case, the size of the input area image 83 is enlarged only in the range of the opaque portion 82 (an arrow Y15). The editing device 1 reduces the size of the characters such that the rows 86 to 89 fit in the input area image 83.

Figure 11:
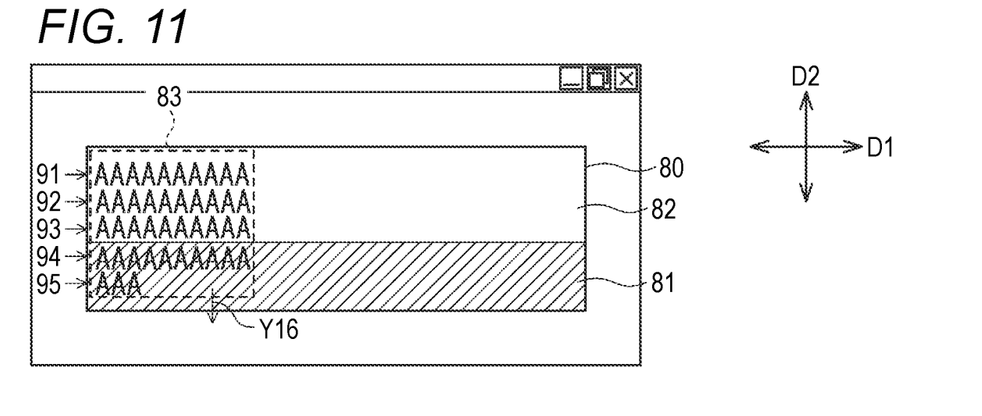
FIG. 11 is a view showing a state in which the size of the input area image 83 is enlarged by a second method according to the second instruction.

The second is that the maximum range in which the input area image 83 changed in size change may be arranged is the entire medium image 80. Hereinafter, a change method of changing the size of the input area image 83 such that the entire medium image 80 is the maximum range is referred to as an entire change method. In this case, for example, as shown in FIG. 11, a plurality of line feeds are inserted between the characters to form rows 91, 92, 93, 94, 95, and the size of the input area image 83 is enlarged downward such that the rows 91 to 95 fit in the input area image 83 in the orthogonal direction D2 (an arrow Y16). In this case, the input area image 83 is enlarged not only in the opaque portion 82 but also in the transparent portion 81.

Figure 12:
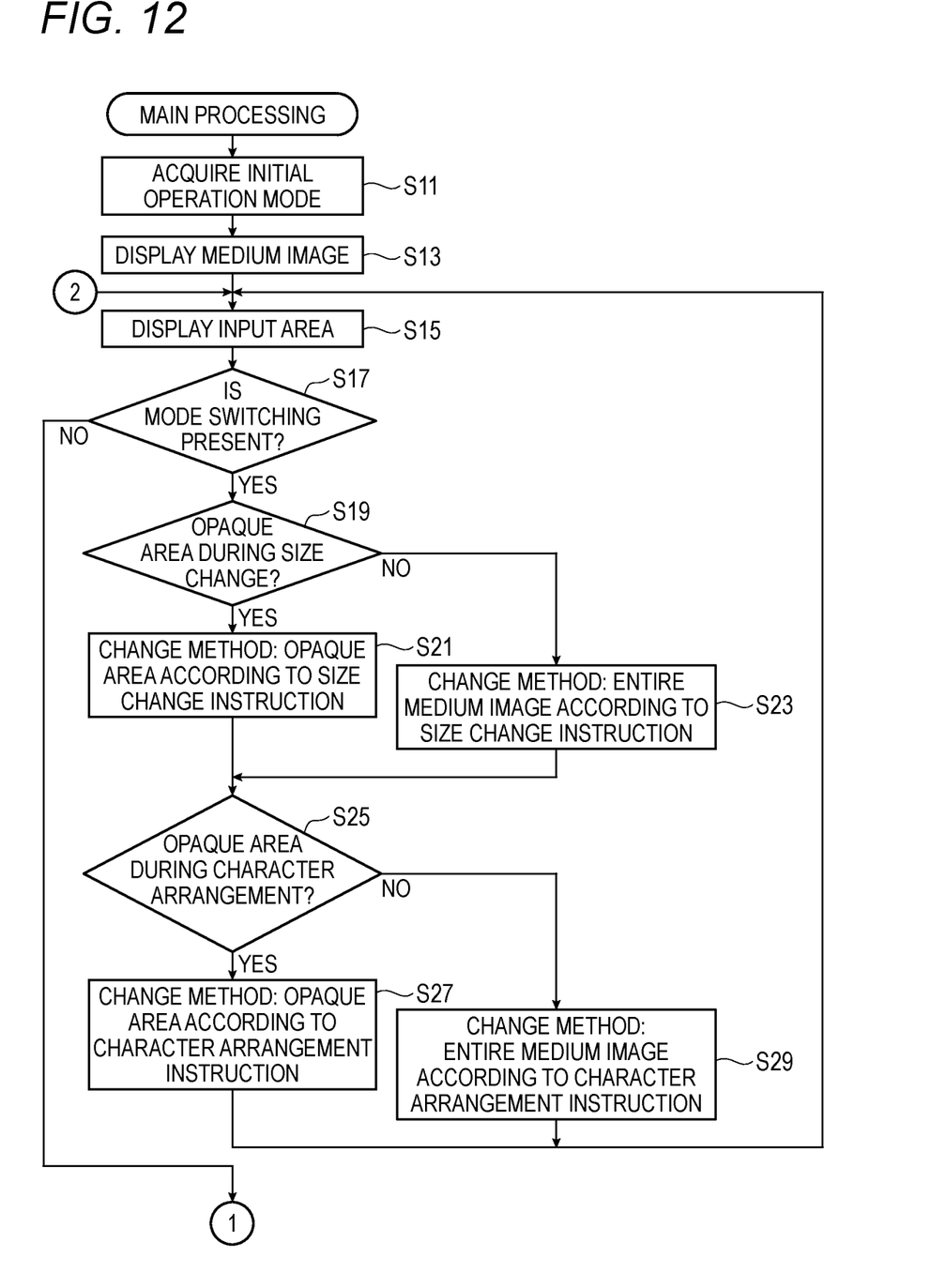
FIG. 12 is a flowchart of main processing.
Figure 13:
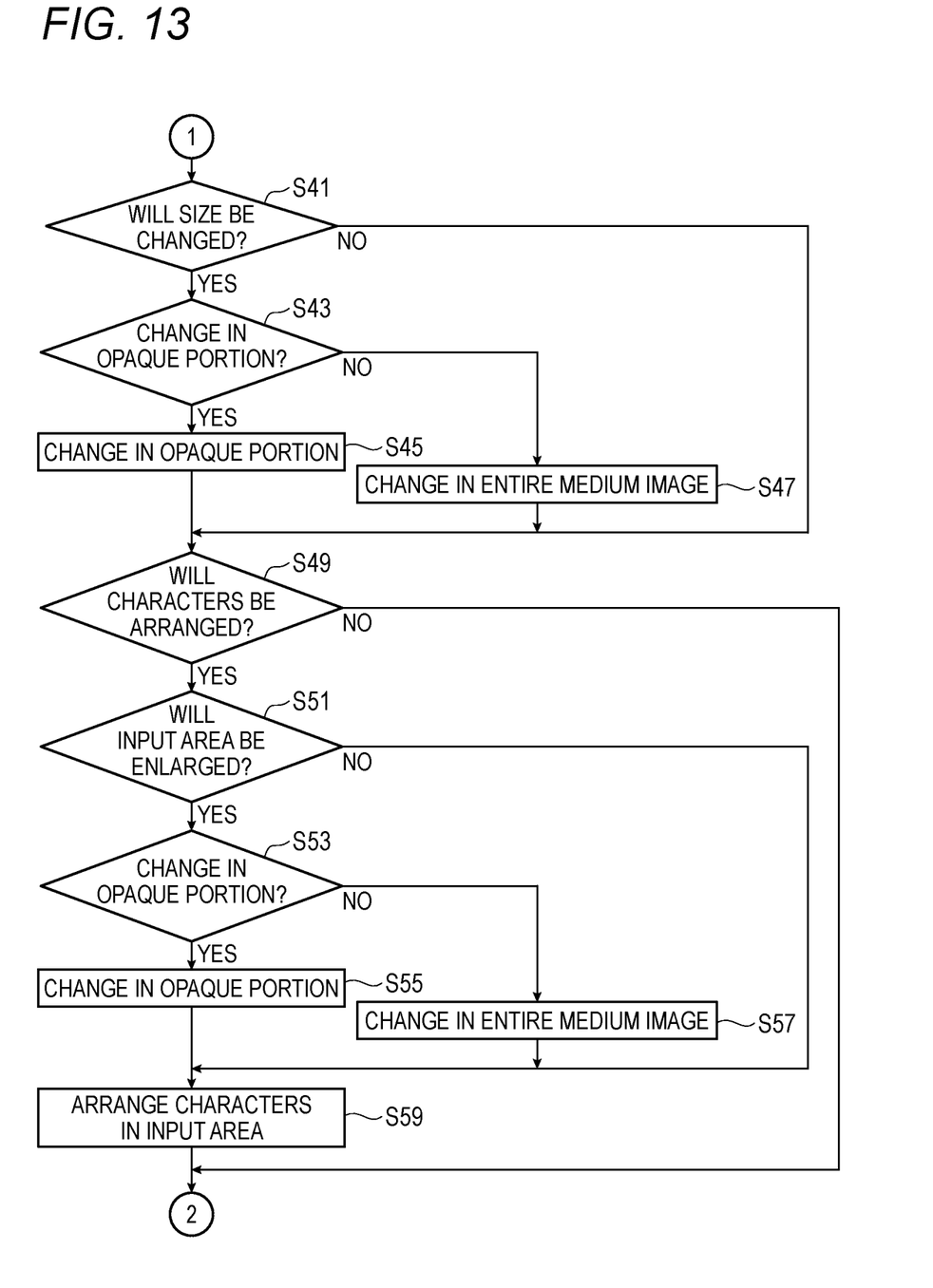
FIG. 13 is a flowchart of the main processing which is a continuation of FIG. 12.

The editing device 1 may operate by switching between the opaque change method and the entire change method as the method of changing the size of the input area image 83 by the following main processing (see FIGS. 12 and 13). Hereinafter, an operation mode that defines the change method when the size of the input area image 83 is changed according to the size change instruction is referred to as a size change mode. The operation mode that defines the change method when the size of the input area image 83 is changed according to the character arrangement instruction is referred to as a character arrangement mode. The size change mode and the character arrangement mode are stored in the flash memory 14.

Main Processing

The main processing will be described with reference to FIGS. 12 and 13. When an instruction for starting the editing processing is input via the input unit 16, the main processing is started by reading and executing the program stored in the flash memory 14 with the CPU 11. The ROM 12 stores information indicating that the size of the input area image 83 is changed by the opaque change method (hereinafter referred to as "opaque change information") as an initial value of each of the size change mode and the character arrangement mode.

When the size change mode and the character arrangement mode are not stored in the flash memory 14, the CPU 11 acquires the initial value (the opaque change information) of each of the size change mode and the character arrangement mode stored in the ROM 12 (S11). The CPU 11 stores the acquired opaque change information in the flash memory 14 as information on the size change mode and the character arrangement mode.

Figure 14:
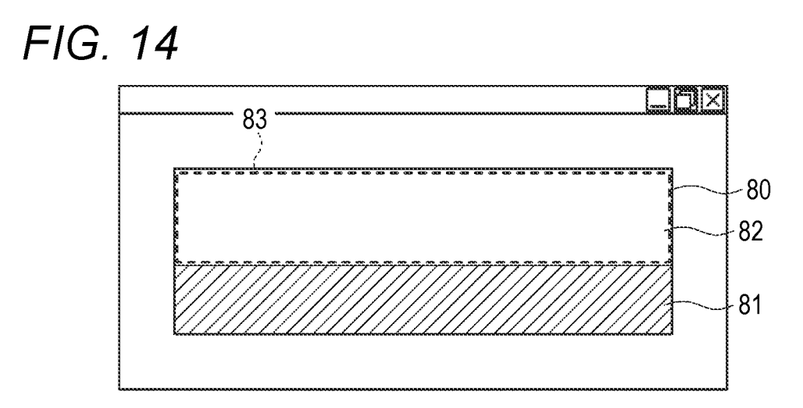
FIG. 14 is a view in which the newly displayed input area image 83 is displayed by the first method.
Figure 15:
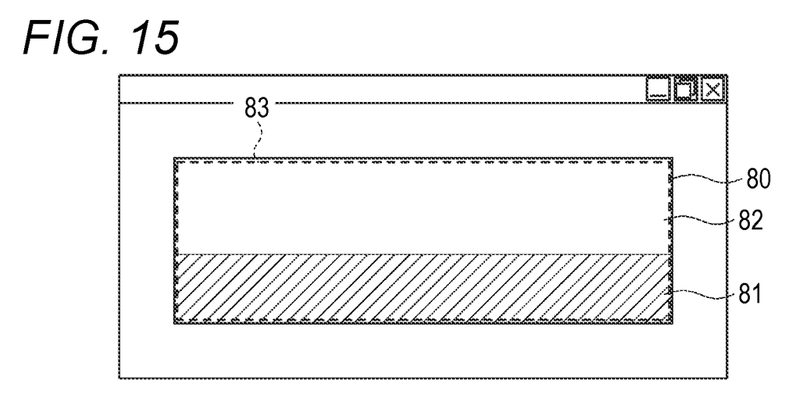
FIG. 15 is a view in which the newly displayed input area image 83 is displayed by the second method.

The CPU 11 displays the medium image 80 on the display unit 15 (S13). The CPU 11 further displays a new input area image 83 in a superimposed manner on the medium image 80 (S15). At this time, when the opaque change information is stored in the flash memory 14 as the information indicating the size change mode, the CPU 11 displays the input area image 83 having a shape the same as the opaque portion 82 of the medium image 80 in the superimposed manner on the medium image 80 (S15, see FIG. 14). In other words, this case corresponds to a case where the method of changing the size of the input area image 83 according to the size change instruction is set to be the opaque change method. On the other hand, when information indicating that the size of the input area image 83 is changed by the entire change method (hereinafter referred to as "entire change information") is stored the flash memory 14 as the information indicating the size change mode, the CPU 11 displays the input area image 83 having a shape the same as the entire medium image 80 in a superimposed manner on the medium image 80 (S15, see FIG. 15).

The CPU 11 determines whether a switching instruction for switching between the size change mode and the character arrangement mode is input via the input unit 16 (S17). When determining that the switching instruction is input (S17: YES), the CPU 11 determines whether a switching instruction for setting the maximum range of the input area image 83 as the range of the opaque portion 82 (the opaque change method) is input via the input unit 16 regarding the size change mode (S19). When determining that the switching instruction for setting the maximum range of the input area image 83 as the range of the opaque portion 82 is input (S19: YES), the CPU 11 stores the opaque change information in the flash memory 14 as the information indicating the size change mode (S21). In this case, the change method when the input area image 83 is changed according to the size change instruction is switched to the opaque change method. The CPU 11 advances the processing to S25.

When determining that the switching instruction for setting the maximum range of the input area image 83 as a range of the entire medium image 80 (the entire change method) is input via the input unit 16 regarding the size change mode (S19: NO), the CPU 11 stores the entire change information in the flash memory 14 as the information indicating the size change mode (S23). In this case, the change method when the input area image 83 is changed according to the size change instruction is switched to the entire change method. The CPU 11 advances the processing to S25.

The CPU 11 determines whether a switching instruction for selling the maximum range of the input area image 83 as the range of the opaque portion 82 (the opaque change method) is input via the input unit 16 regarding the character arrangement mode (S25). When determining that the switching instruction for selling the maximum range of the input area image 83 as the range of the opaque portion 82 is input (S25: YES), the CPU 11 stores the opaque change information in the flash memory 14 as the information indicating the character arrangement mode (S27). In this case, the change method when the input area image 83 is changed according to the character arrangement instruction is switched to the opaque change method. The CPU 11 returns the processing to S15.

When determining that the switching instruction for setting the maximum range of the input area image 83 as the range of the entire medium image 80 (the entire change method) is input via the input unit 16 regarding the character arrangement mode (S25: NO), the CPU 11 stores the entire change information in the flash memory 14 as the information indicating the character arrangement mode (S29). In this case, the change method when the input area image 83 is changed according to the character arrangement instruction is switched to the entire change method. The CPU 11 returns the processing to S15.

When the CPU 11 determines that the switching instruction is not input (S17: NO), the processing proceeds to S41 (see FIG. 13). As shown in FIG. 13, the CPU 11 determines whether the size change instruction that is an instruction for changing the size of the input area image 83 is input via the input unit 16 (S41). When determining that the size change instruction is input (S41: YES), the CPU 11 determines whether to change the size of the input area image 83 by the opaque change method (S43). When the opaque change information is stored in the flash memory 14 as the information indicating the size change mode, the CPU 11 determines to change the size of the input area image 83 by the opaque change method (S43: YES). The CPU 11 changes the size of the input area image 83 according to the size change instruction such that the range of the opaque portion 82 is the maximum range (S45). CPU 11 advances the processing to S49. When the entire change information is stored in the flash memory 14 as the information indicating the size change mode, the CPU 11 determines to change the size of the input area image 83 by the entire change method (S43: NO). The CPU 11 changes the size of the input area image 83 according to the size change instruction such that the range of the entire medium image 80 is the maximum range (S47). CPU 11 advances the processing to S49.

In the above description, when determining that the size change instruction for maximizing the input area image 83 is input (S41: Yes), the CPU 11 changes the size of the input area image 83 such that the input area has a shape the same as the opaque portion 82 by the processing of S45. On the other hand, the CPU 11 changes the size of the input area image 83 such that the input area image 83 has a shape the same as the entire medium image 80 by the processing of S47.

The CPU 11 determines whether the character arrangement instruction that is an instruction for arranging the characters in the input area image 83 is input via the input unit 16 (S49). When the CPU 11 determines that the character arrangement instruction is not input (S49: NO), the processing returns to S15 (see FIG. 12).

When determining that the character arrangement instruction is input (S49: YES), the CPU 11 determines whether an increase in the size of the input area image 83 is required in order to fit the characters in the input area image 83 according to the number of characters arranged in the input area image 83 according to the character arrangement instruction (S51). When the CPU 11 determines that the characters fit in the input area image 83 without increasing the size of the input area image 83 (S51: Yes), the processing proceeds to S59.

When determining that the increase in the size is required in order to fit the characters in the input area image 83 (S51: YES), the CPU 11 determines whether to change the input area image 83 by the opaque change method (S53). When the opaque change information is stored in the flash memory 14 as the information indicating the character arrangement mode, the CPU 11 determines to change the size of the input area image 83 by the opaque change method (S53: YES). The CPU 11 changes the size of the input area image 83 according to the character arrangement instruction such that the range of the opaque portion 82 is the maximum range (S55). The CPU 11 advances the processing to S59. When the entire change information is stored in the flash memory 14 as the information indicating the character arrangement mode, the CPU 11 determines to change the size of the input area image 83 by the entire change method (S53: NO). The CPU 11 changes the size of the input area image 83 according to the character arrangement instruction such that the range of the entire medium image 80 is the maximum range (S57). The CPU 11 advances the processing to S59. The CPU 11 arranges the characters in the input area image 83 according to the character arrangement instruction (S59). The CPU 11 returns the processing to S15 (see FIG. 12).

Functions and Effects of Present Embodiment

The editing device 1 prevents the characters from being printed on the transparent area 61 of the tape 6 by changing the size of the input area image 83 based on the opaque change method. The editing device 1 may print the characters on the entire tape 6 including the transparent area 61 and the opaque area 62 by changing the size of the input area image 83 based on the entire change method. Therefore, the editing device 1 may edit the layout of the characters such that printing in the transparent area 61 of the tape 6 is suppressed and the printing in the transparent area 61 is performed as required. The user of the editing device 1 can easily switch the method of changing the size of the input area image 83 to the opaque change method in which the opaque portion 82 is the maximum range or the entire change method in which the entire medium image 80 is the maximum range.

When the size change instruction for maximizing the input area image 83 is input (S41: YES), the editing device 1 sets the input area image 83 to be a size the same as the range of the opaque portion 82 or sets the input area image 83 to be a size the same as the range of the entire medium image 80 depending on the size change mode (S45, S47). Therefore, even when the instruction for maximizing the input area image 83 is input, the editing device 1 may switch whether to perform printing on the transparent area 61 of the tape 6. The editing device 1 may determine whether to perform printing on the transparent area 61 of the tape 6 based on an operation mode (the size change mode) when the size of the input area image 83 is changed according to the size change instruction.

When the line feed is inserted between the characters as the number of characters arranged in the input area image 83 increases to form a plurality of rows, the editing device 1 increases the size of the input area image 83 such that the plurality of rows fit in the input area image 83 in the orthogonal direction D2. At this time, the editing device 1 changes the size of the input area image 83 such that the range of the opaque portion 82 is the maximum range or changes the size of the input area image 83 such that the range of the entire medium image 80 is the maximum range depending on the character arrangement mode (S55, S57). Therefore, the editing device 1 may switch whether to perform printing on the transparent area 61 of the tape 6 while enlarging the input area image 83 such that all the characters fit in the input area image 83.

When the new input area image 83 is displayed to be overlapped on the medium image 80 (S15), the editing device 1 may switch whether to display the input area image 83 having the same shape as the opaque portion 82 or to display the input area image 83 having the same shape as the entire medium image 80. The editing device 1 may display the new input area image 83 on the display unit 15 according to the change method when the size of the input area image 83 is changed by the size change instruction or the character arrangement instruction.

Modification

The present invention is not limited to the above embodiment, and various modifications may be made. The above editing processing may be executed by a CPU (not shown) of the printing device 2. That is, the printing device 2 may generate the print data while editing the layout of the characters, and perform printing on the tape 6.

The size change instruction for changing the size of the input area image 83 is not limited to the instruction using the cursor 83A or the instruction for maximizing the input area image 83. For example, the size of the input area image 83 may be changed by inputting the respective lengths of the input area image 83 in the elongated direction and the width direction. The character arrangement instruction for arranging the characters in the input area image 83 may be executed, for example, by reading a file including a plurality of characters.

The editing device 1 may display two or more input areas in a superimposed manner on the medium image 80. In this case, when another new second input area is added while the first input area is overlapped on the medium image 80, the editing device 1 may determine the size of the second input area according to the size change mode. Setting of a method of changing the size of the two or more input areas 83 may be defined for each of the two or more input areas 83.

When the size of the input area image 83 is changed by the opaque change method, the maximum range in which the input area image 83 may be arranged may be one size smaller than the opaque portion 82. When the size of the input area image 83 is changed by the entire change method, the maximum range in which the input area image 83 may be arranged may be one size smaller than the medium image 80.

Others

The CPU 11 of the editing device 1 is an example of a "controller" according to the present invention. The processing of S15 is an example of "display processing" according to the present invention. The processing of S21, S23 are examples of "first switching processing" according to the present invention. The processing of S27, S29 are examples of "second switching processing" according to the present invention. The processing of S45, S47, S55, S57 are examples of "change processing" and "second change processing" according to the present invention. The transparent area 61 is an example of a "light-transmitting area" according to the present invention. The opaque area 62 is an example of a "non-light-transmitting area" according to the present invention. The size change instruction is an example of a "first instruction" according to the present invention. The character arrangement instruction is an example of a "second instruction" according to the present invention. The opaque change method is an example of a "first method" and a "third method" according to the present invention. The entire change method is an example of a "second method" and a "fourth method" according to the present invention.

What is claimed is:

1. An editing device comprising:
 a controller configured to edit a layout of characters to be printed on a printing medium including a light-transmitting area having translucency and a non-light-transmitting area having no translucency,
 wherein the controller executes:
 displaying, on a display unit, an input area image corresponding to an input area in which the characters are arranged by overlapping the input area image on a medium image showing the printing medium;
 changing a size of the input area image displayed in the displaying, using first method or second method, according to a first instruction for changing the size of the input area, the first method being changing the size of the input area by setting a portion of the medium image corresponding to the non-light-transmitting area as a maximum range, the second method being changing the size of the input area by setting the entire medium image as a maximum range; and
 switching between the first method and the second method as a first switching.

2. The editing device according to claim 1,
 wherein, in the changing, the size of the input area image is changed in accordance with the first instruction for maximizing the size of the input area.

3. The editing device according to claim 1,
 wherein in a case where a new input area image is displayed on the display unit in the displaying by overlapping the new input area image on the medium image, when the first method is selected in the first switching, the input area image having a size the same as a size of the portion of the medium image corresponding to the non-light-transmitting area is displayed, when the second method is selected in the first switching, the input area image having a size the same as a size of the entire medium image is displayed.

4. The editing device according to claim 1, wherein the controller executes:

changing the size of the input area image displayed in the displaying, using third method or fourth method, according to a second instruction for arranging the characters in the input area, the third method being changing the size of the input area by setting a portion of the medium image corresponding to the non-light-transmitting area as a maximum range, the fourth method being changing the size of the input area by setting the entire medium image as a maximum range; and switching between the third method and the fourth method as a second switching.

5. An editing device comprising:

a controller configured to edit a layout of characters to be printed on a printing medium including a light-transmitting area having translucency and a non-light-transmitting area having no translucency, wherein the controller executes:

displaying, on a display, an input area image corresponding to an input area in which the characters are arranged by overlapping the input area image on a medium image showing the printing medium;

changing a size of the input area image displayed in the displaying, using first method or second method, according to a second instruction for arranging the characters in the input area, the first method being changing the size of the input area by setting a portion of the medium image corresponding to the non-light-transmitting area as a maximum range, the second method being changing the size of the input area by setting the entire medium image as a maximum range; and switching between the first method and the second method as a second switching.

6. The editing device according to claim 5, wherein the input area image is enlarged as the number of the characters arranged in the input area increases when the changing is performed according to the second instruction.

7. A printing system comprising:

the editing device according to claim 1; and a printing device configured to print the characters on the printing medium based on the layout edited by the editing device.

8. A printing system comprising:

the editing device according to claim 5; and a printing device configured to print the characters on the printing medium based on the layout edited by the editing device.

9. An editing method for editing a layout of characters to be printed on a printing medium including a light-transmitting area having translucency and a non-light-transmitting area having no translucency, the editing method comprising:

displaying, on a display unit, an input area image corresponding to an input area in which the characters are arranged by overlapping the input area image on a medium image showing the printing medium;

changing a size of the input area image displayed in the displaying, using first method or second method, according to a first instruction for changing the size of the input area, the first method being changing the size of the input area by setting a portion of the medium image corresponding to the non-light-transmitting area as a maximum range, the second method being changing the size of the input area by setting the entire medium image as a maximum range; and switching between the first method and the second method as a first switching.

10. An editing method for editing a layout of characters to be printed on a printing medium including a light-transmitting area having translucency and a non-light-transmitting area having no translucency, the editing method comprising:

displaying, on a display unit, an input area image corresponding to an input area in which the characters are arranged by overlapping the input area image on a medium image showing the printing medium;

changing a size of the input area image displayed by the displaying, using first method or second method, according to a second instruction for arranging the characters in the input area, the first method being changing the size of the input area by setting a portion of the medium image corresponding to the non-light-transmitting area as a maximum range, the second method being changing the size of the input area by setting the entire medium image as a maximum range, and switching between the first method and the second method as a second switching.

* * * * *